United States Patent

Fujiwara et al.

Patent Number: 6,055,007
Date of Patent: Apr. 25, 2000

[54] IMAGE PROCESSING DEVICE AND IMAGE READING DEVICE

[75] Inventors: Yoko Fujiwara, Zama; Masaaki Kuriyama; Takashi Honda, both of Machida, all of Japan

[73] Assignee: Minolta Co., Ltd., Osaka, Japan

[21] Appl. No.: 08/219,445

[22] Filed: Mar. 29, 1994

[30] Foreign Application Priority Data

Mar. 31, 1993 [JP] Japan .................................. 5-073442

[51] Int. Cl.[7] .......................... B41J 2/435; G01D 15/14; H01J 29/70; H01J 33/00
[52] U.S. Cl. ........................................................ 347/131
[58] Field of Search .............................. 318/96; 250/214, 250/571; 347/131; 358/443, 448, 447, 296, 298

[56] References Cited

U.S. PATENT DOCUMENTS 4,679,074 7/1987 Sugiura et al. .
4,837,450 6/1989 Satomura et al. .
4,873,428 10/1989 Takeuchi et al. .

FOREIGN PATENT DOCUMENTS 63-215262A 9/1988 Japan .
4-37258A 2/1992 Japan .

*Primary Examiner*—John Barlow
*Assistant Examiner*—Raquel Yvette Gordon
*Attorney, Agent, or Firm*—Burns, Doane, Swecker & Mathis, LLP

[57] ABSTRACT

This invention concerns an image processing device for adjusting the density of an image and an image reading device incorporating the image processing device and aims to enhance the repeatability of pseudo-gradient without reference to density distribution of the image. The image processing device which fulfills the purpose of compensating the gradient of image data consisting of multivalue digital signals comprises means ME1 to ME3 for storing a plurality of gradient compensation data T1 to T3 having mutually different contents of compensation, means for detecting a contrast of an image on the basis of a group of image data conforming to one image, and means for switching the contents of compensation for the image data by selecting one of the three gradient compensation data T1 to T3 in conformity with the contrast.

13 Claims, 19 Drawing Sheets

FIG.9
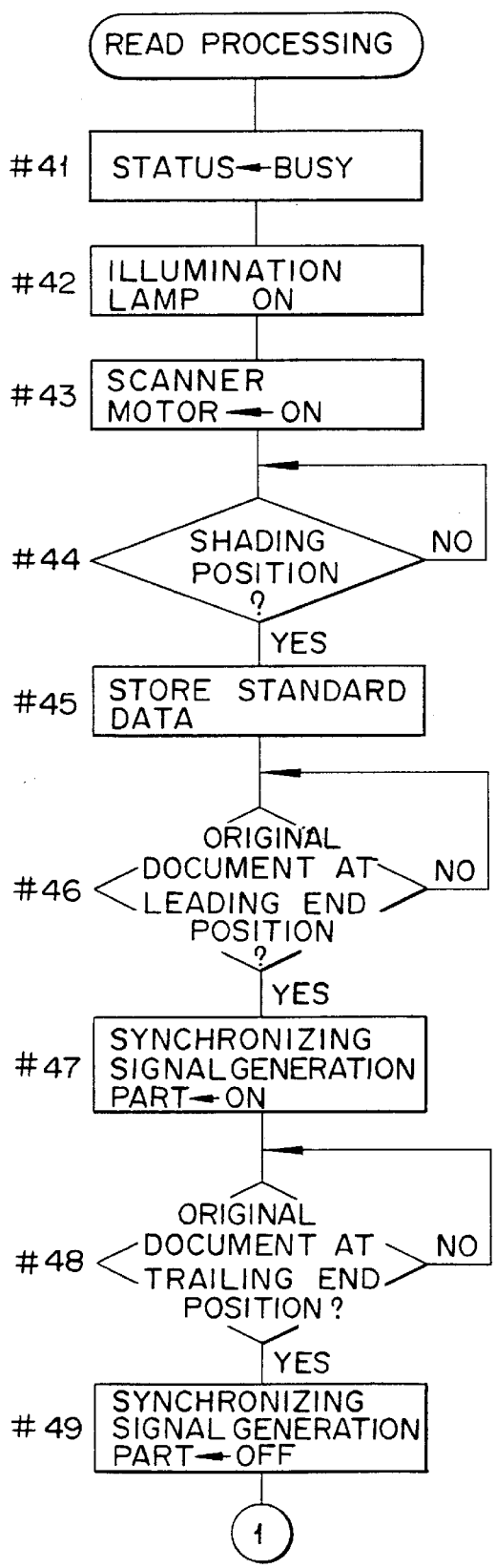
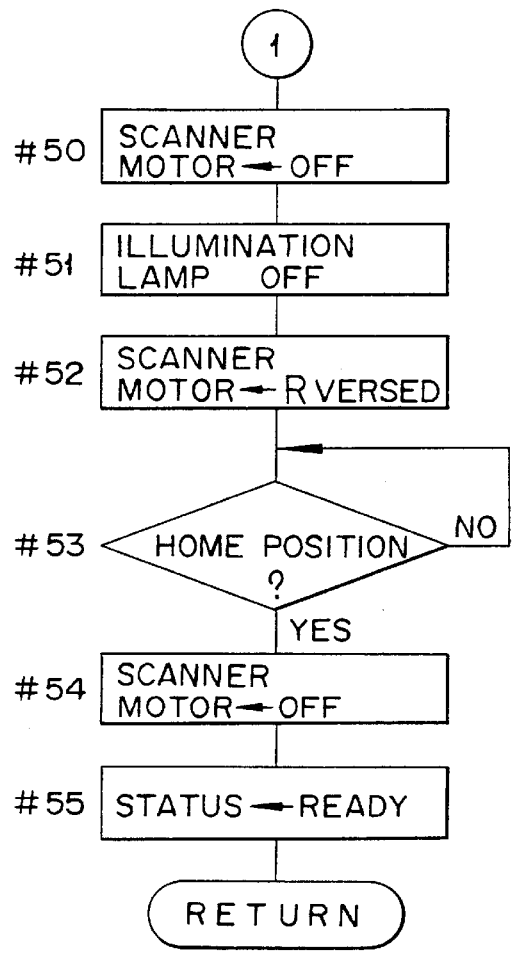

IMAGE PROCESSING DEVICE AND IMAGE READING DEVICE

BACKGROUND OF THE INVENTION

This invention relates to an image processing device for adjusting the density of an image and an image reading device having the image processing device incorporated therein.

As image input means for such digital devices as copying machine, facsimile, film scanner, OCR (optical character reader), optical filing system, and various display devices which form, memorize, and display images by the combination of dots (pixels) of a fixed size, an image reading device (image reader) which reads an image on a given original document in the form of an aggregate of distinctly divided pixels has been in popular use.

Generally, the image reading device is so constructed as to operate by a procedure which comprises reading the image of a given original document by the use of a one-dimensional image sensor extending in the direction of main scanning, converting the analog signals of the individual pixels obtained by the reading into pixel data in the form of multivalue digital signals, subjecting the pixel data resulting from the conversion to image processing, and producing binary image data corresponding to the individual pixels.

The image processing which is performed in the image reading device is known in numerous forms including edge enhancing and smoothing processings for the improvement of image quality, trimming and negative-positive inverting processings for the editing of an image, density conversion processings for effecting tone compensation in accordance with the γ characteristics of an externally connected device (image reproducing means such as a printer) to intensify the density gradient during the reproduction of an image, and binarization processings for the conversion of multivalue data in accordance with the density of each of the pixels of an original document into binary data, for example.

The so-called lookup table method is widely adopted for the density conversion processings. To be specific, the compensation of image data is accomplished by installing an ROM (read only memory) having stored therein a conversion table which is a collection of necessary compensation image data and consequently enabling such compensation image data as are stored at addresses answering the numerical values of input image data to be read out in the form of output image data D.

With respect to binarization processing, the so-called simple binarization processing which resides in comparing a multivalue level of one given pixel with a fixed threshold level is suitable for handling such linear images as characters from the point of view of the quality of a reproduced image and the pseudogradient processing which resorts to the dither method or the error diffusion method is suitable for handling such intermediate tone images as photographs. Where an original document which contains both linear images and intermediate tone images in a mixed state is to be read, therefore, the simple binarization processing and the pseudogradient processing are used as switched in accordance with the attributes of a given image which decide between a linear image and an intermediate tone image (hereinafter referred to occasionally as "binarization attributes").

Incidentally, the conventional image reading device has performed the density conversion processing by the use of one and the same conversion table. In other words, the contents of the tone compensation performed on image data have been set and fixed so as to exalt the reproducibility of images relative to images of standard density distribution.

Thus, in the binarization by the pseudogradient processing, the conventional image reading device suffers from impairment of the reproducibility of white and black parts of an image having a large density contrast and conversely entails the problem of reproducing such an unnatural image as a binary image from an image having a small density contrast.

SUMMARY OF THE INVENTION

This invention has for its object the exaltation of the reproducibility of pseudogradient processing without reference to the density distribution of an image.

To accomplish the object described above, this invention provides an image processing device for processing multivalue image data, comprising a memory having stored therein a plurality of sets of tone compensation data having mutually different contents, detecting means for detecting a density contrast of an image represented by a group of image data, selecting means for selecting one of the aforementioned sets of tone compensation data in response to the density contrast detected by the detecting means, and compensating means for compensating the tone of image data on the basis of the tone compensation data selected by the selecting means.

To accomplish this object, the present invention further provides an image reading device, comprising a lamp, an image sensor for reading an image on an original document illuminated with the lamp and producing multivalue image data corresponding to the density of each of the individual pixels of the image, compensating means for compensating the tone of image data produced from the image sensor on the basis of tone compensation data, adjusting means for adjusting the luminous energy of the lamp so as to establish concurrence between the median in the substantial range of compensation due to the tone compensation data and a threshold, and binarization means for binarizing the image data having the tone thereof compensated by the aforementioned compensating means on the basis of the aforementioned threshold.

BRIEF DESCRIPTION OF THE DRAWINGS

FIG. 9 is a flow chart illustrating the reading processing of FIG. 5.

DESCRIPTION OF THE PREFERRED EMBODIMENTS

Figure 1:
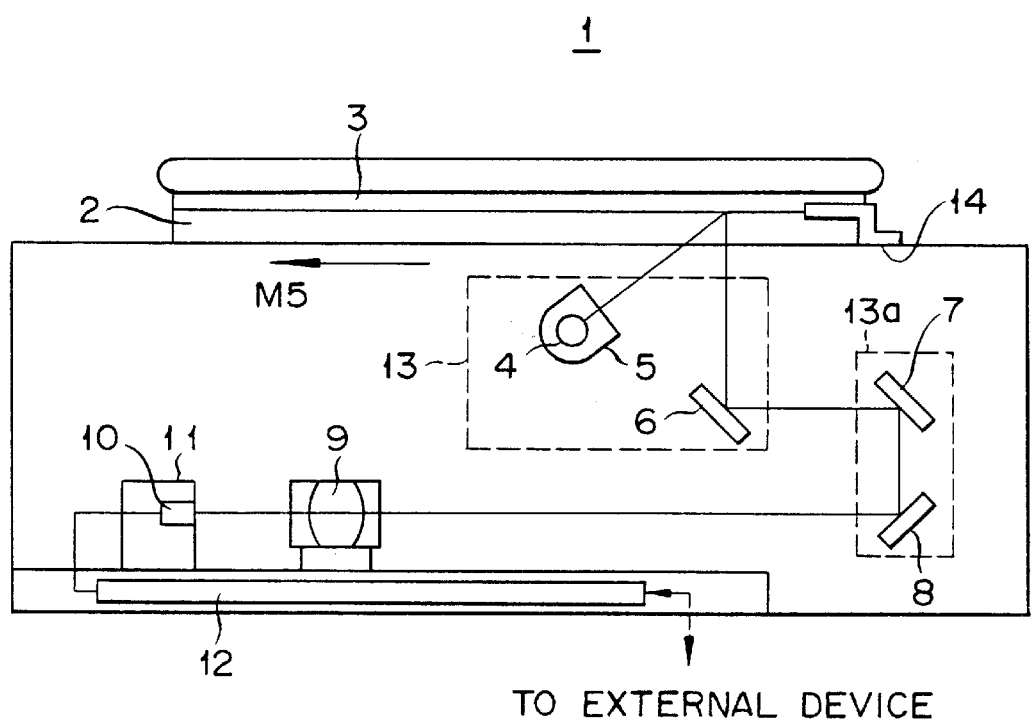
FIG. 1 is a sectioned front view illustrating schematically the construction of an image reader according to this invention.

FIG. 1 is a sectioned front view illustrating schematically the construction of an image reader according to this invention.

An image reader 1 is provided on the upper surface of a rectangular housing with a platen glass 2 which is capable of supporting thereon an original document of the A3 size and an original document cover 3 adapted to keep an original document placed on the platen glass 2 fast in place. The platen glass 2 is provided at the front end part thereof relative to the direction of scanning with a standard pattern 14 which is formed of a white image for the compensation of shading.

Inside the housing, there are provided an optical system set in place so as to be capable of scanning an image on the original document in the direction of an arrow M5 (direction of sub-scanning) below the platen glass 2 and an electric circuit system 12 adapted to form image data in conformity with the density or color of the image of the original document.

The optical system is composed of a first slider 13 incorporating an illumination lamp 4, a reflection mirror 5, and a mirror 6 therein, a second slider 13a incorporating a mirror 7 and a mirror 8 therein, and a main lens 9, etc. The first slider 13 and the second slider 13a are driven as controlled so that the rate of motion of the second slider 13a is v/2 relative to the rate of motion of the first slider 13 taken as v.

The scanning light which has passed through the main lens 9 is allowed to impinge on an image sensor 10 attached to a supporting member 11 and is converted into an electric signal (image signal). The image sensor 10 is formed of a plurality of CCD chips arranged in a continuous pattern in the direction of main scanning (direction of line) and adapted to read the original document at a resolution of 400 pixels/inch. In each of the CCD chips, a multiplicity of light-receiving elements are arranged in a row. The light-receiving elements in the row are divided into three regions. The component light-receiving elements of these three regions are severally provided on their surfaces with spectral filters such that the regions severally admit the three colors, R (red), G (green), and B (blue). The light-receiving elements correspond one each to the pixels of the image on the original document and they severally emit to the electric circuit part 12 an image signal conforming with the intensity of a reflected light relative to one of the colors of relevant pixels.

Figure 2:
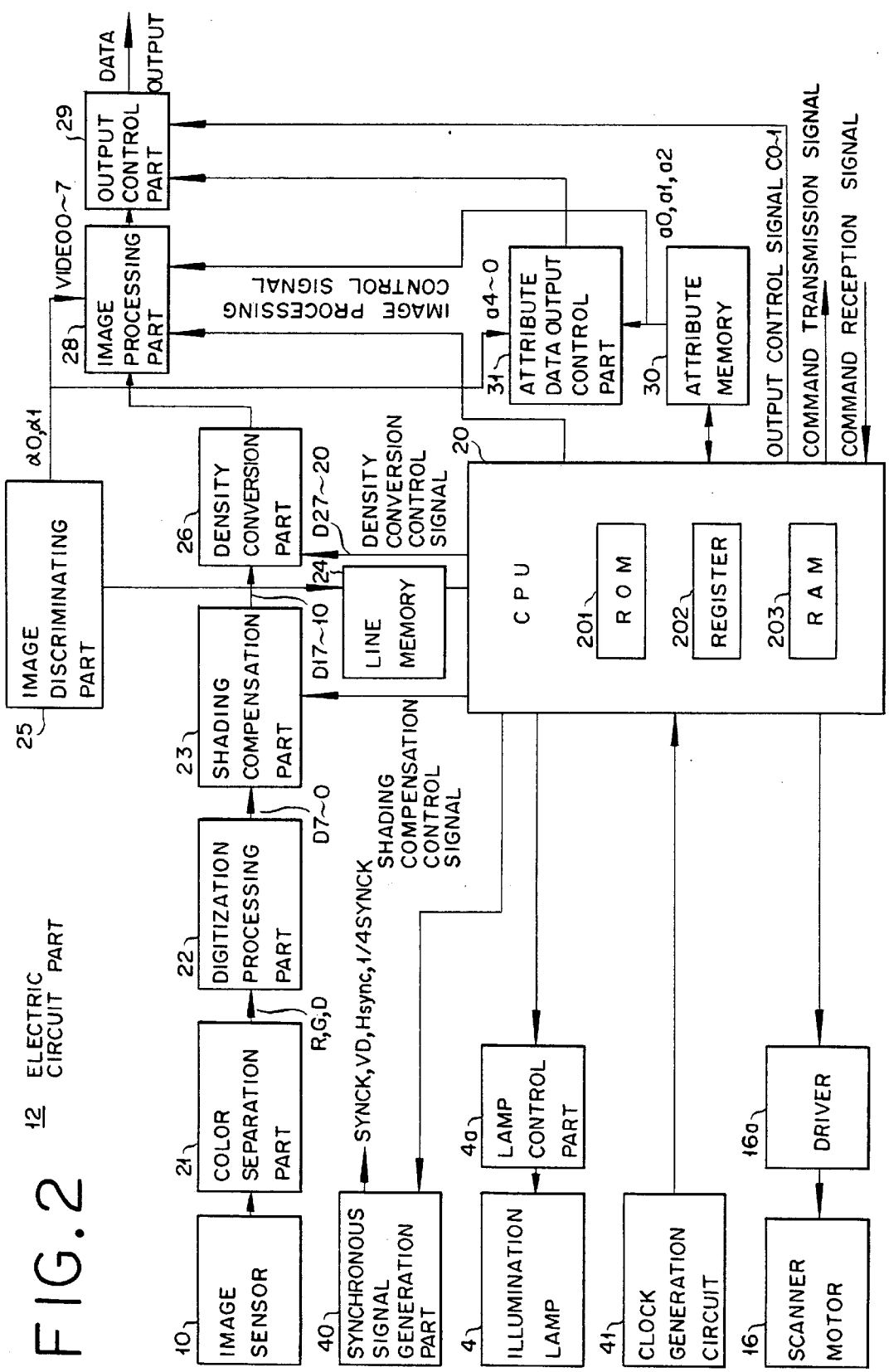
FIG. 2 is a block diagram of an electric circuit part of the image reader of FIG. 1.

FIG. 2 is a block diagram of the electric circuit part 12 of the image reader 1.

The electric circuit part 12 is composed of a color separation part 21 for separating the image signal from the image sensor 10 into signals of the colors R, G, and B and subjecting the separated color signals to prescribed amplification, a digitization processing part 22 for quantizing the analog signals in different colors and emitting image data D7 to D0 of eight bits (256 gradients), a shading compensation part 23 for compensating the dispersion in the direction of main scanning of the image data D7 to D0 due to an uneven distribution of the light from the illuminating lamp 4 or a difference in sensitivity among the bits of the image sensor 10, an image discriminating part 25 for discriminating the attributes of binarization and the attributes of color, a lookup table type density conversion part ($\gamma$ conversion ROM) 26 for performing $\gamma$ conversion in conformity to the density level adjustment and the density characteristics ($\gamma$ characteristics) of the externally connected device, an image processing part 28 for performing digital processing including binarization and image editing, an output control part 29 for controlling data output, an attribute memory 30 for recording designated attribute data a2 to a0, an attribute data output control part 31, a clock generation circuit 41, a line memory 24 for memorizing one line full of the image data D17 to D10 issued from the shading compensation part 23, a synchronous signal generation part 40 for issuing various synchronization signals, a lamp control part 4a for controlling the switching of the illumination lamp 4, a driver 16a for driving a scanner motor 16 for scanning, and a CPU 20 for controlling all of the component parts mentioned above.

The CPU 20 has built therein a ROM 201 for storing a processing program, a register 202 for storing various flags and status data temporarily therein in execution of the program, and a RAM 203 destined to form a work area. The CPU 20 performs communication for the reception and transmission of data indicative of a varying command and the operation state (status) of the image reader 1 with an external host device fitted with manual operation means, forms designation attribute data a2 to a0 for designating image editing or binarization processing based on the received commands prior to the reading of the image of an original document, and stores the designation attribute data a2 to a0 in the attribute memory 30. In the image reader 1, the designation attribute data a0, a1, and a2 are the data for designating the binarization processing, the negative-positive inversion, and the trimming respectively.

Incidentally, the synchronization signals to be issued by the synchronization signal generator 40 include a horizontal synchronization signal Hsync which is issued for each line of main scanning, an pixel clock signal SYNCK which forms the standard for data transmission timing for each pixel, and an output enable signal VD which indicates the effective duration for the data issued from the image reader 1, for example. In the shading compensation part 23, the image data D7 to D0 are subjected to shading compensation and, at the same time, these image data D7 to D0 which have been data proportional to the intensity of the reflected light are converted by a logarithmic computation based on visional characteristics into density data proportional to the density of an image.

The image discrimination part 25 is intended to form a judgment to discriminate between a character region and a photograph region in an image or decide whether or not the color edition has a place designated therefor. The discrimination attribute data a0 issued by the image discrimination part 25 assumes the value "0" when the divided region subjected to the discrimination corresponds to a character image (character region) or the value "1" when this divided region corresponds to an intermediate tone image (photograph region). In contrast thereto, the discrimination attribute data a1 assumes the value "1" when the divided region subjected to the discrimination corresponds to a specific color or the value "0" when the divided region corresponds to a color other than the specific color.

Figure 3:
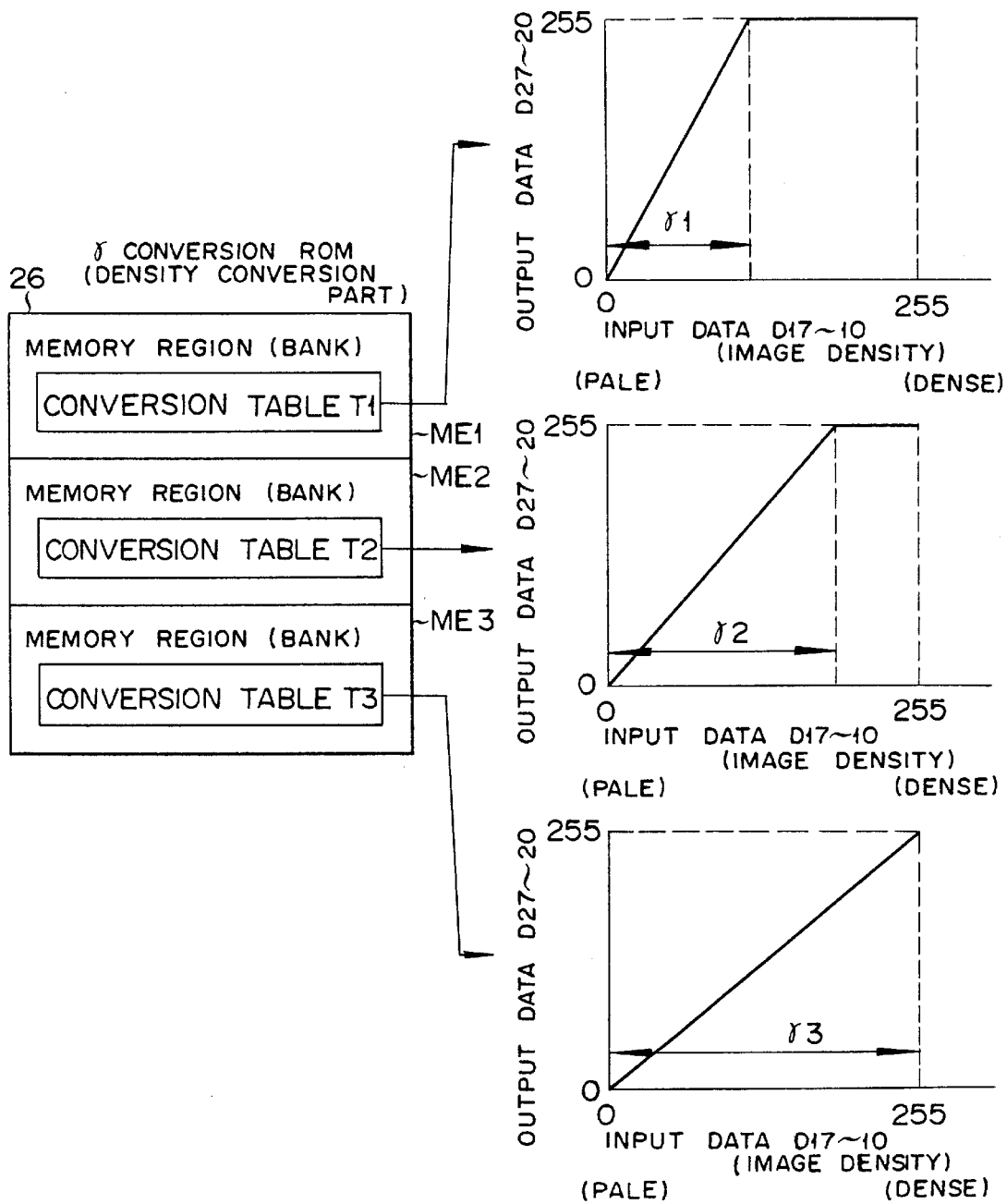
FIG. 3 is a diagram illustrating the construction of a density converting part of FIG. 2.

FIG. 3 is a block diagram illustrating the construction of the density conversion part 26.

The density conversion part 26 is formed of a γ conversion ROM incorporating three memory regions (banks) ME1 to ME3 therein. The memory regions ME1 to ME3 have respectively stored therein conversion tables T1 to T3 for input/output characteristics which will be described specifically afterward.

The conversion tables T1 to T3 are selectively used by the density conversion control which is effected by the CPU 20. To be specific, in the γ conversion, the CPU 20 allows access to one of the memory regions ME1 to ME3 and causes the data at an address designated by the memory region and the value "0" to "255" of the image data D17 to D10 received from the shading compensation part 23 to be read out as image data D27 to D20.

Figure 4:
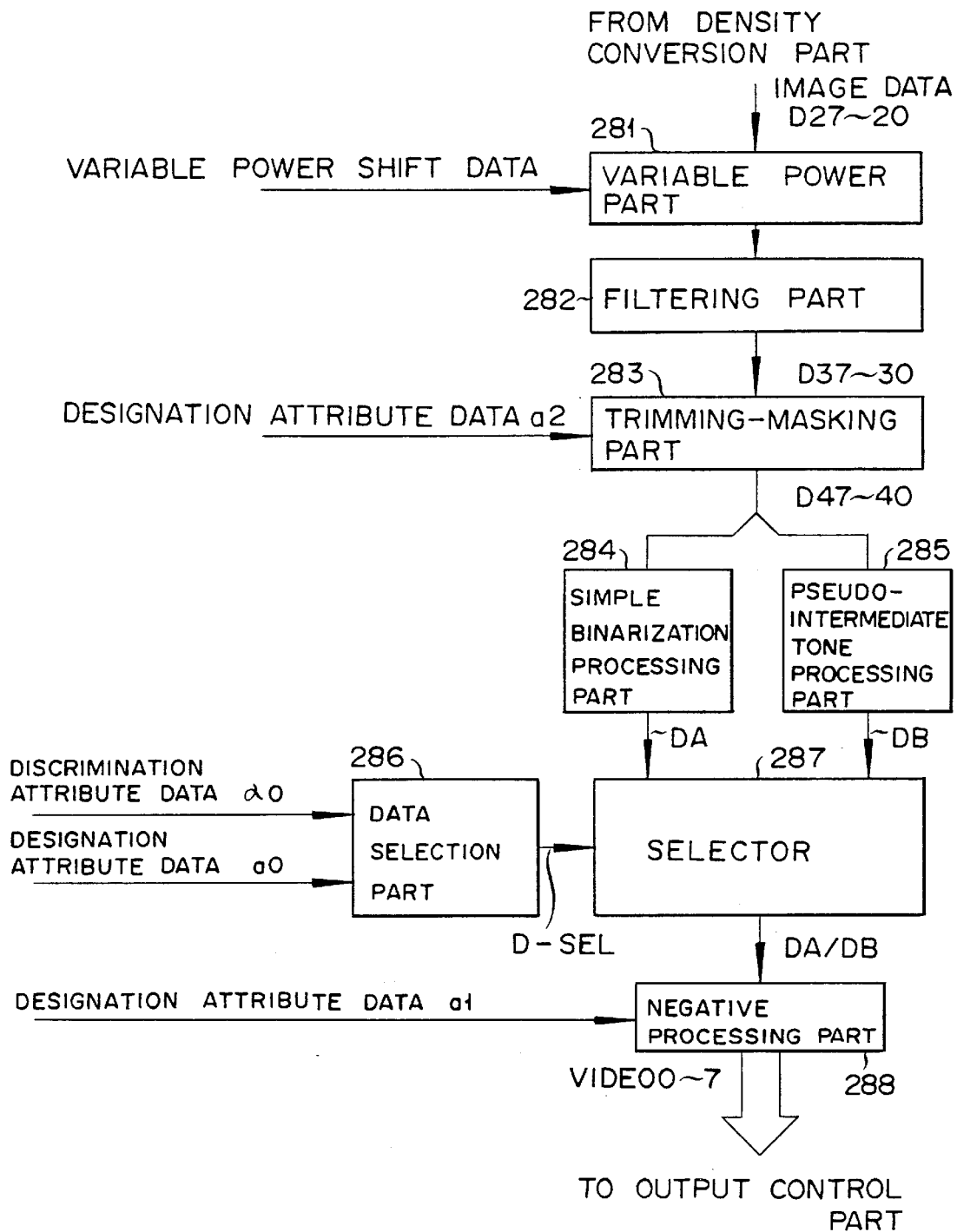
FIG. 4 is a block diagram of an image processing part of FIG. 2.

FIG. 4 is a block diagram illustrating the image processing part 28.

The image processing part 28 is intended for the processing of an image signal introduced from the image sensor 10 and, thus, is composed of a variable power part 281, a filtering part 282, a trimming-masking part 283, a simple binarization processing part 284, a pseudo-intermediate tone processing part 285, a data selection part 286, a selector 287, and a negative processing part 288.

To the image processing part 28, the image data D27 to D20 from the density conversion part 26 are serially injected in the order of arrangement of pixels. The image data D27 to D20 thus introduced are first subjected in the variable power part 281 to variable power processing as set by the CPU 20. Then, in the filtering part 282, the data are subjected to processings for the improvement of image quality such as edge enhancement and smoothing to give rise to image data D37 to D30 to be discharged.

In the trimming-masking part 283 which operates in response to the designation attribute data a2, when the data a2 is "1", the processing of masking forces the image data D37 to D30 to assume the value of "0" corresponding to a blank part and to be consequently discharged as image data D47 to D40. When the data a2 is "0", the image data D37 to D30 are passed unaltered and are discharged as image data D47 to D40 (data through).

The image data D47 to D40 issued from the trimming-masking part 283 are binarized in the simple binarization processing part 284 and the pseudo-intermediate tone processing part 285 and are simultaneously discharged as binary image data DA, DB to be injected as such into the selector 287.

The selector 287 selects either of the two binary image data DA, DB in accordance with the output data D-SEL from the data selection part 286 and emits the selected data as an output. To the data selection part 286, the designation attribute data a0 for controlling the binarization processing are imparted together with the aforementioned discrimination attribute data α0 obtained by automatic discrimination of the binary attribute. The value of the output data D-SEL is fixed by the value of the data a0. To be specific, when the data a0 is "0", the discrimination attribute data α0 are emitted unaltered as the output data D-SEL. When the data a0 is "1", the data obtained by the inversion of the discrimination attribute data α0 are issued as an output.

In the image processing part 28, when the designation attribute data a0 is "0", the external designation of the binarization processing is defaulted and the binary image data based on the automatic discrimination of the binarization attribute by the image discrimination part 25 are issued as an output. When the data a0 is "1", the binary image data which have undergone the binarization processing which is the opposite of the result of the automatic discrimination of the binarization attribute are issued as an output.

The negative processing part 288 issues the binary image data introduced from the selector 287 in their unaltered form when the designation attribute data a1 is "0" or the inverted binary image data when the data a1 is "1" respectively as image data VIDEO 0 to 7 each composed of eight parallel pixels.

Now, the operation of the image reader 1 will be described below with reference to the flow charts of FIGS. 5 to 14.

Figure 5:
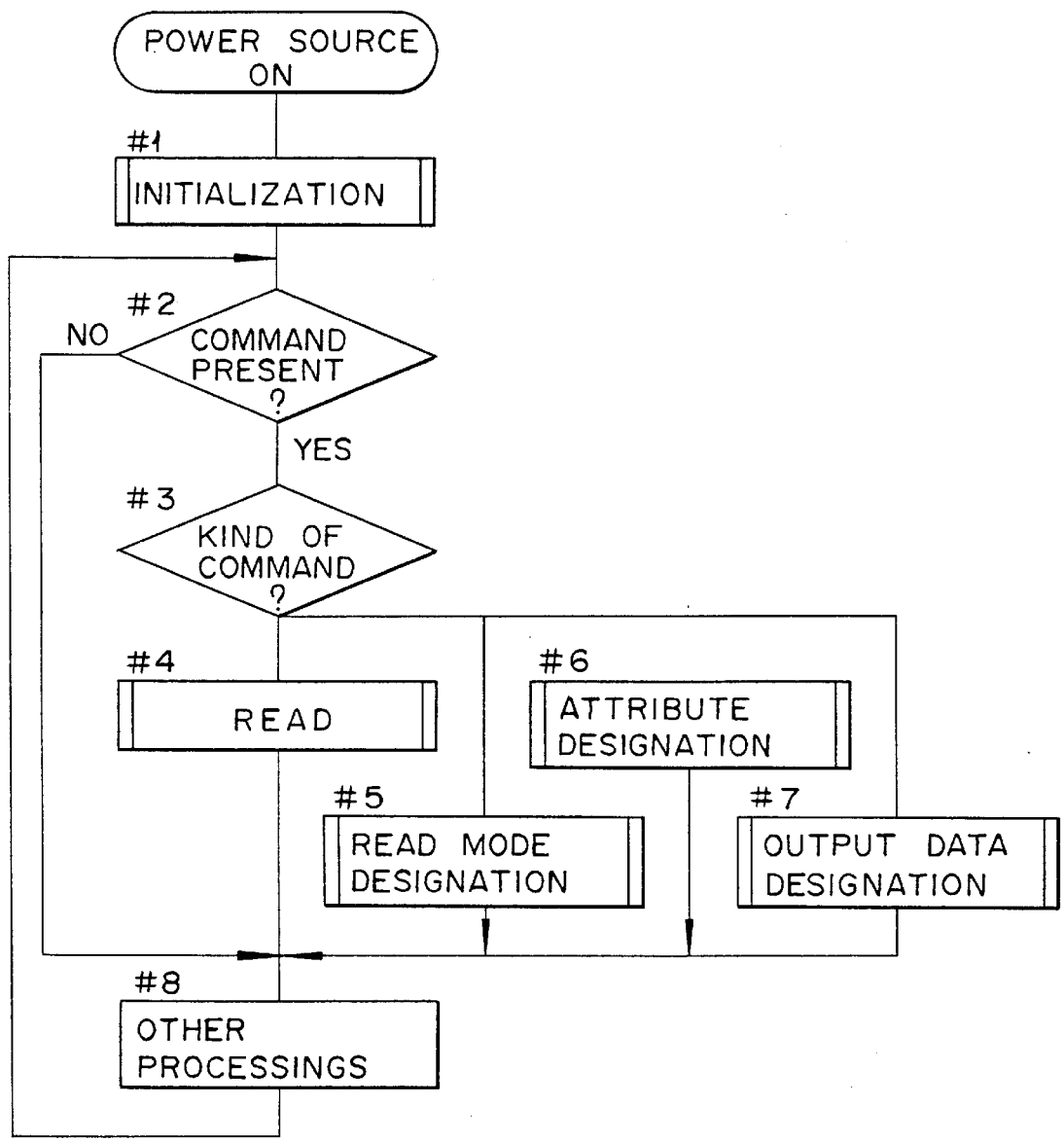
FIG. 5 is a main flow chart illustrating schematically the operation of a CPU.

FIG. 5 is a main flow chart schematically illustrating the operation of the CPU 20.

When the power source is connected to the system and the program is started, the system is initialized at Step #1.

Then, the presence or absence of a command from the host device is checked at Step #2. When the presence of a command is confirmed, the kind of this command is discerned (Step #3) and, depending on the kind of the command, the read processing (Step #4), the read mode designation processing (Step #5), the attribute designation processing (Step #6), and the output data designation processing (Step #7) are executed.

Thereafter, other processings such as for effecting detection of the status of operation (Step #8) are executed and the program is returned to Step #2. The processings at Steps #2 to #8 are subsequently repeated.

Figure 6:
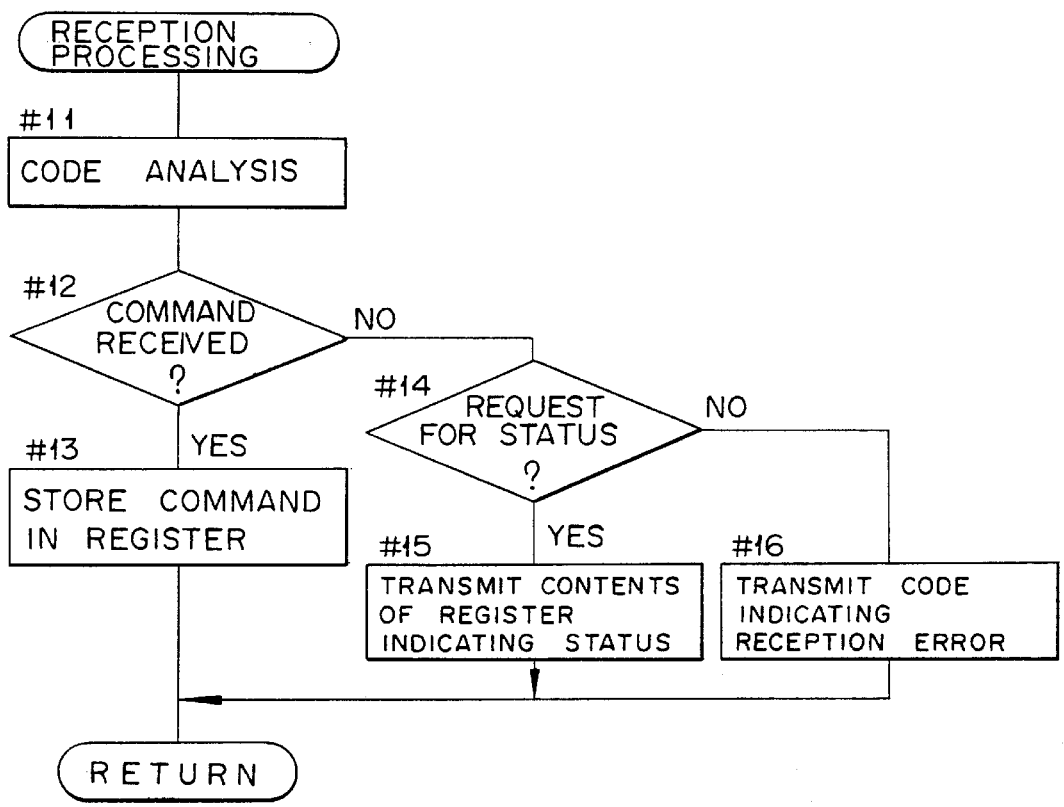
FIG. 6 is a flow chart illustrating reception processing.
Figure 7:
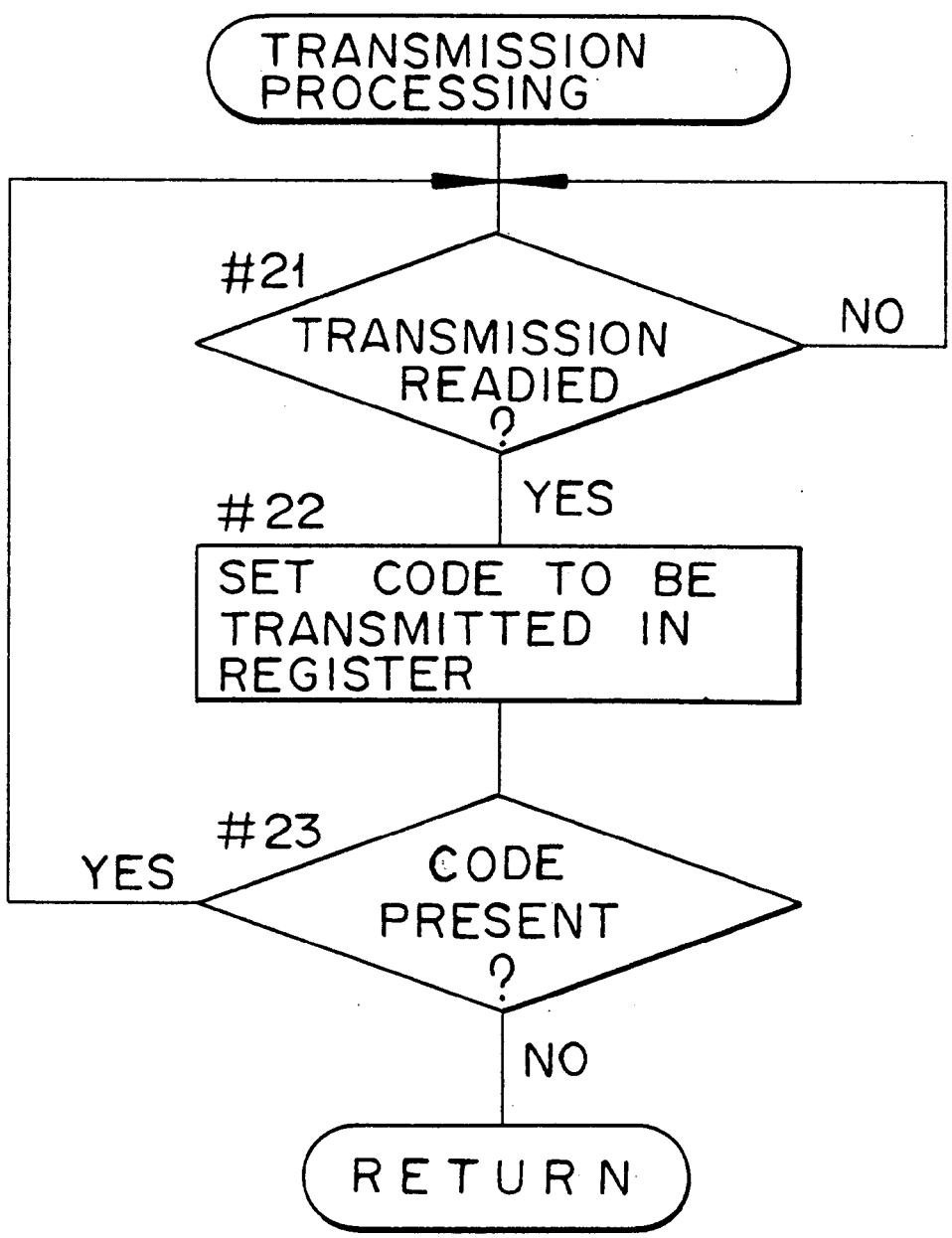
FIG. 7 is a flow chart illustrating transmission processing.

FIG. 6 is a flow chart illustrating the reception processing and FIG. 7 is a flow chart illustrating the transmission processing.

These routines are interrupt routines and are executed from time to time in response to an access from the host device.

In the reception processing of FIG. 6, first the received signal is subjected to code analysis (Step #11). When the reception of a command is confirmed at Step #12, the received command is stored at a prescribed area in the register 202 (Step #13).

When the received signal happens to designate a request for information on the status (Step #14), the data indicating the status such as the state of wait are read out of the register 202 and transmitted to the host device (Step #15).

When the received signal does not correspond to either the predefined command or the request for status, code data which indicate a reception error are transmitted (Step #16).

In the transmission processing shown in FIG. 7, the system waits until the previous transmission is completed and the next transmission is readied (Step #21) and code data to be transmitted are set in the register 202 (Step #22). Then, at Step #23, the presence or absence of code data to be subsequently transmitted, namely the presence or absence of necessity for transmission, is checked. When the necessity for transmission is confirmed, the flow of processing is returned to Step #21.

Figure 8:
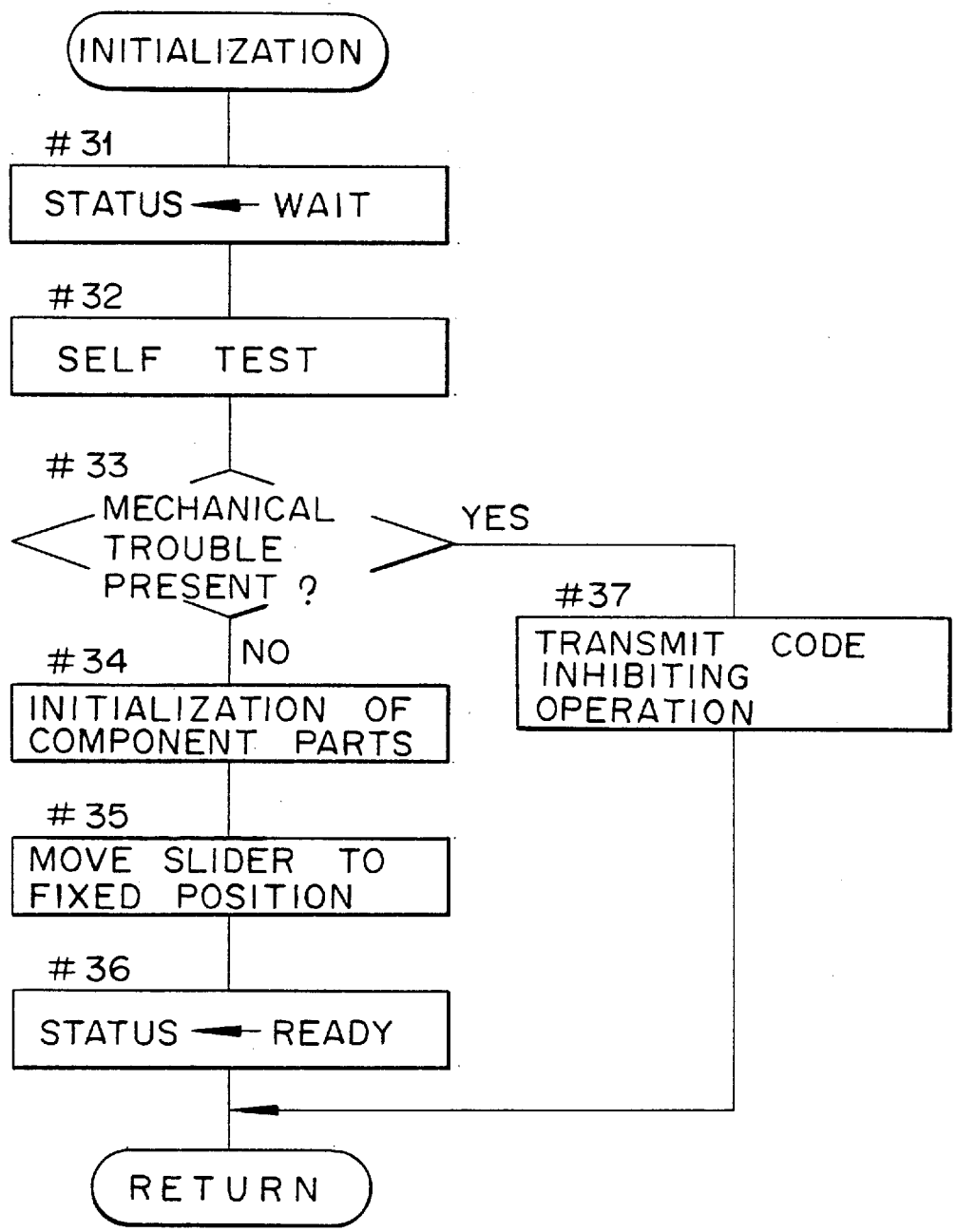
FIG. 8 is a flow chart illustrating the initial setting processing of FIG. 5.

FIG. 8 is a flow chart of the initialization processing at Step #1 shown in FIG. 5.

First, the status "WAIT" which indicates that the system is being readied for read scanning is set. Specifically, the data corresponding to "WAIT" are stored at the status area in the register 202 (Step #31).

Then, at Step #32, a self test for checking the system to find whether or not the component parts are normally operating is carried out. At Step #33, the presence or absence of a mechanical trouble in the system is checked. When the presence of a mechanical trouble is confirmed, the flow of processing is moved to Step #37 to effect transmission of the code inhibiting operation to the host device. When the absence of a mechanical trouble is confirmed, the flow of processing is advanced to Step #34 to effect initialization of the relevant component parts.

In the initialization at this time, "0" is written in the attribute memory 30 as the designation attribute data a0, a1, and a2. Thereafter in the image processing part 28, therefore, the image editing processings by trimming and negative-positive inversion are not executed and the binarization processing is destined to be carried out on the basis of the discrimination attribute data α0 unless the designation attribute data a2 to a0 are not rewritten. The density is set at a standard level in the density conversion part 26 and the inlet to the selector is so selected in the output control part 29 that the image data VIDEO 0 to 7 and the attribute data a2 to a0 are alternately issued.

After the initialization which is carried out as described above, the first slider 13 is moved to the home position (Step #35) and, subsequent to this motion, the status is changed from "WAIT" to "READY" representing the state of readiness (Step #36).

FIG. 9 is a flow chart illustrating the read processing performed at Step #4 as shown in FIG. 5.

First, the status is set at "BUSY" which indicates that the reading is in process (Step #41) and the illumination lamp 4 is turned on (Step #42).

Then, a scanner motor 16 is turned on (Step #43) and the arrival of the first slider 13 at the shading position, namely a position directly below the standard pattern 14, is waited (Step #44).

After the arrival of the slider 13 at the standard pattern 14, the standard pattern 14 is read for the sake of compensation of the shading and the standard image data (white data) are stored in the line memory 24 (Step #45).

Subsequently, the arrival of the slider 13 at the leading end position of the original document is waited at Step #46 and the synchronizing signal generation part 40 is turned on and made to issue a signal to synchronize at Step #47. As a result, the relevant parts of the system operate in response to the signal to synchronize and the image data VIDEO 0 to 7 and the attribute data a4 to a0 which are rendered effective after the scanning of the 9th line is started are alternately issued.

The completion of the scanning of the whole image on the original document, namely the arrival of the slider 13 at the trailing end position of the original document, is waited (Step #48). Then, the synchronizing signal generation part 40 is turned off (Step #49), the scanner motor 16 is provisionally turned off (Step #50), and the illumination lamp 4 is turned off (Step #51).

Now, the scanner motor 16 is operated reversely to set the sliders 13, 13a in a return motion (Step #52), the return of the slider 13 to the home position is waited (Step #53), the scanner motor 16 is turned off (Step #54), and finally the status is set at "READY" in Step #55.

Figure 10:
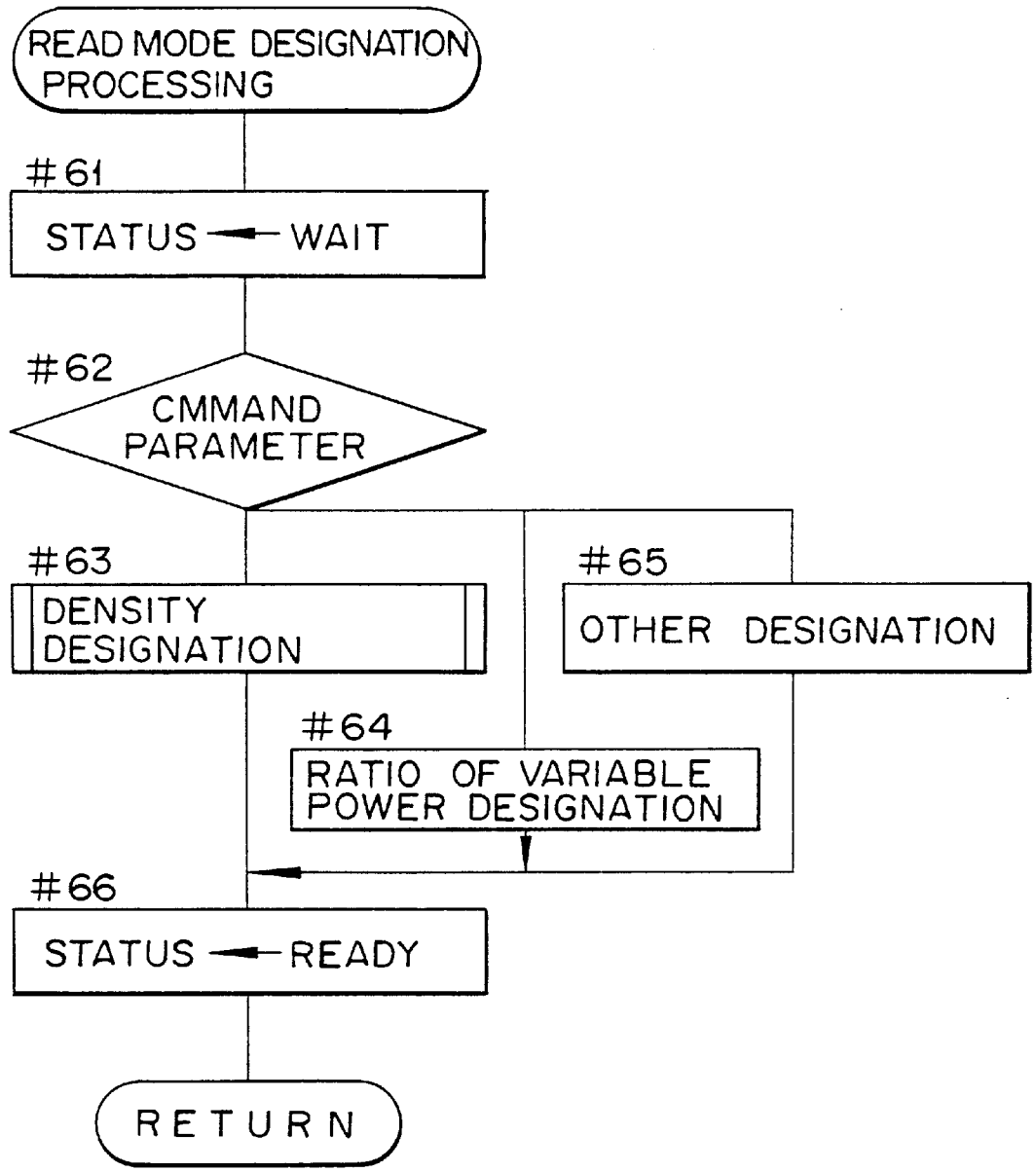
FIG. 10 is a flow chart illustrating the read mode designating processing of FIG. 5.

FIG. 10 is a flow chart illustrating the read mode designation processing which is performed at Step #5 in the flow of processing shown in FIG. 5.

The status is set at "WAIT" at Step #61, the parameter contained in the command is checked at Step #62, in accordance with the parameter, the density is designated (Step #63), the ratio of variable power is designated (Step #64), and other designations such as the designation of a device as the destination of the output are executed (Step #65). Then, the status is returned to "READY" at Step #66.

Figure 11:
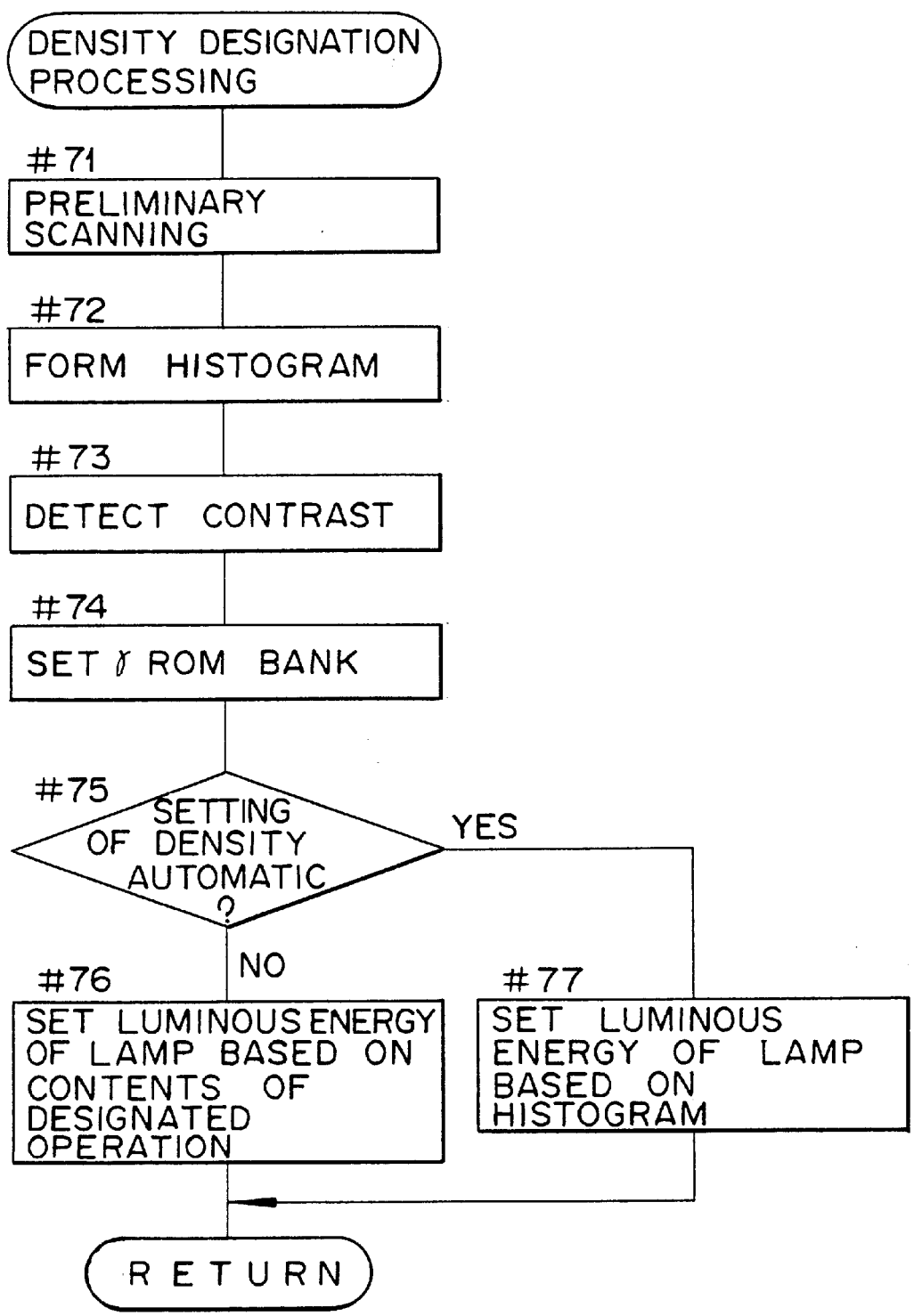
FIG. 11 is a flow chart illustrating the density designating processing of FIG. 10.

FIG. 11 is a flow chart illustrating the density designation processing which is performed at Step #63 in the flow of processing shown in FIG. 10.

First, a preliminary scanning for detecting the trend of image density is carried out and the image data D17 to D10 which are sequentially stored in the line memory 24 are admitted from time to time in the RAM 203 at Step #71. In the preliminary scanning, the sliders 13, 13a are moved at a higher rate than in the main scanning to read the original document at a coarse pitch of 2 mm, for example. In this case, the luminous energy of the illuminating lamp 4 is set at a level at which the output of the CCD to be emitted when the CCD reads out the standard image (white image) verges on saturation.

Figure 15:
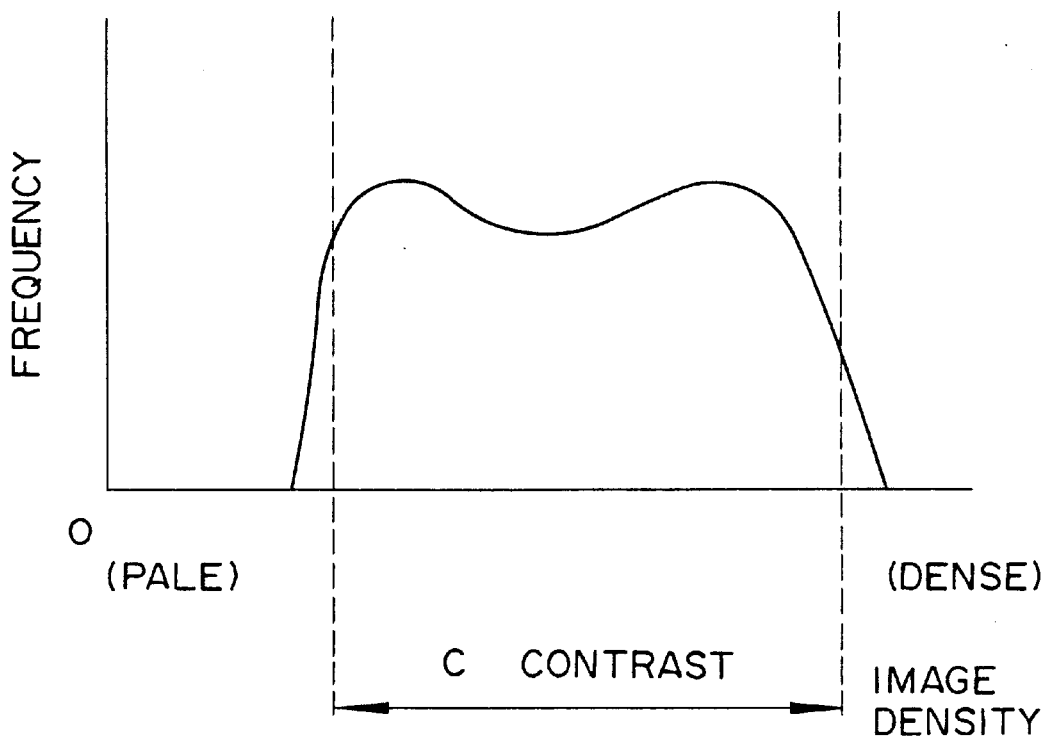
FIG. 15 is a histogram showing one example of the density distribution of an image.

At Step #72, the outputs (data values) of the component pixels are produced based on the image data D17 to D10 of the RAM 203 and are plotted to obtain a histogram. In this case, since the density-output characteristics existing under the conditions of preliminary scanning (such as the luminous energy of the lamp, the sensitivity of the image sensor 10, and the AD conversion characteristics) are already known, this histogram can be converted into a histogram showing the density of each of the component pixels as shown in FIG. 15. The new histogram affords data of density distribution.

Then, the image contrast C is obtained on the basis of the histogram of density at Step #73. Though the contrast C ought to represent theoretically the difference between the maximum and the minimum of density on the original document, it is actually obtained for the sake of the present invention on the basis of the maximum and the minimum of a range to be fixed by deducting several % from each of the opposite ends of the total range of density in due consideration of the effects of electrical noise and dust dust on the original document.

At Step #74, one of the three memory regions (banks) ME1 to ME3 of the density conversion part 26 (hereinafter referred to as "γ conversion ROM") is selected as specifically described afterward in accordance with the contract C obtained above. The banks ME1 to ME3 of the γ conversion ROM 26 have severally stored therein conversion tables T1 to T3 which respectively correspond to three density-output characteristics (γ curves). The three density-output characteristics of the present embodiment (herein referred to respectively as γ curve 1, γ curve 2, and γ curve 3) are invariably such that the output data values are proportional to the densities within a prescribed range, though the lines which depict the relation under discussion vary from one γ curve to another. In other words, they are the ranges of input in which the output values are varied with the input-output characteristics, namely the ranges of density (substantial ranges of compensation) γ1, γ2, and γ3, in which the gradients are repeatable during the pseudo-intermediate tone processing by the dither method, are different from one another (γ1<γ2<γ3).

When the value of the contrast C is smaller than (γ1 +δ), the conversion table T1 of the bank ME1 is selected as the lookup table for the purpose of the γ conversion. The symbol δ stands for an empirically optimized constant. The conversion table T2 of the bank ME2 is selected when the value of the contrast C is an intermediate between (γ1+δ) and (γ2+δ) and the conversion table T3 of the bank ME3 is selected when the value of the contrast C is larger than (γ2+δ).

In the repetition of the gradient of a photographic image, for example, an appropriate pseudo-intermediate tone image can be obtained in spite of the contrast C by using a conversion table of a γ curve of a large inclination for an image of a small contrast C or a conversion table of a γ curve of a small inclination for an image of a large contrast C as described above. In short, where the γ curve of the γ conversion is fixed as has been conventionally usual, the repeatability of the white and black parts is impaired by extremely increasing the contrast C as compared with the range of density in which the gradient is repeatable and, conversely, such an unnatural image as a binary image is obtained by extremely decreasing the contrast C. The repeatability of gradient is improved by altering the γ curve of the γ conversion proportionately to the contrast C.

Figure 16:
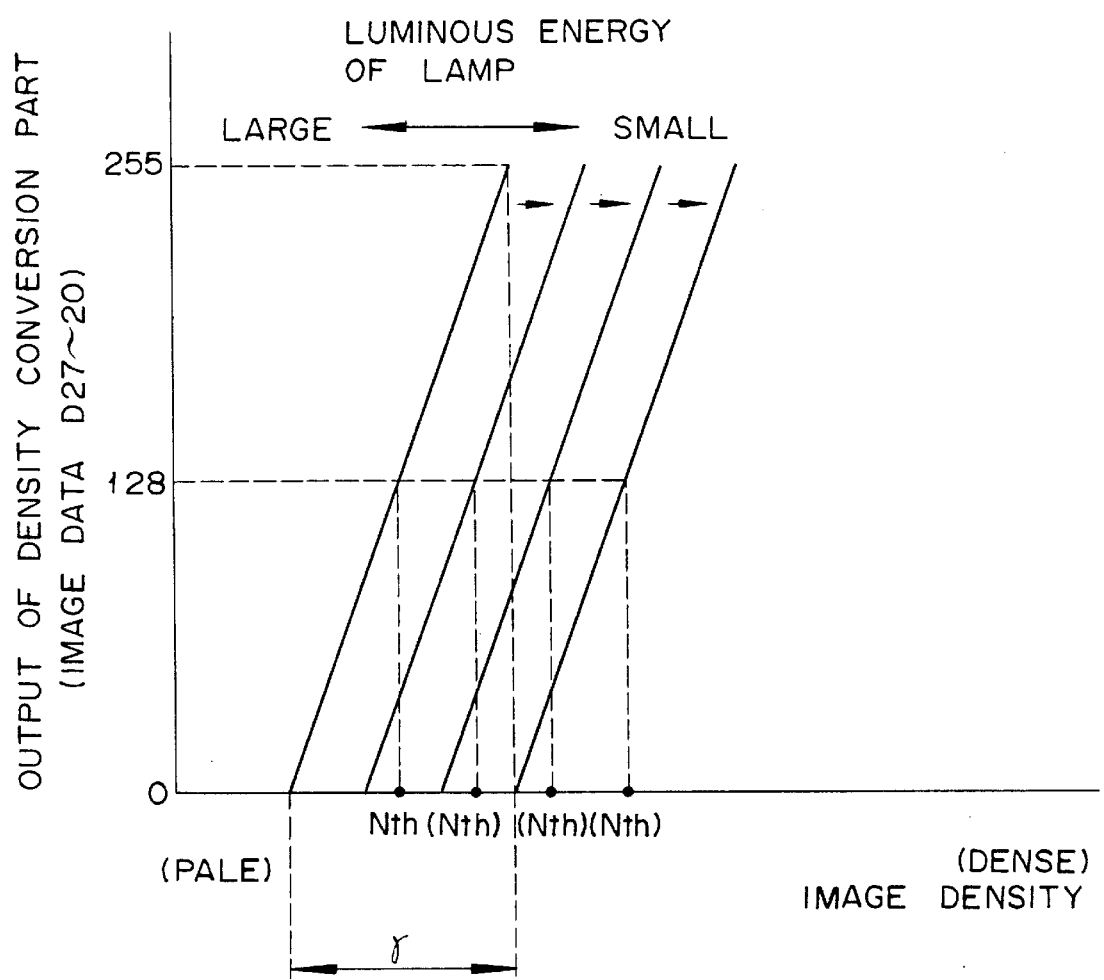
FIG. 16 is a graph showing the input/output characteristics of a density conversion part as the function of the luminous energy used for scanning.
Figure 17:
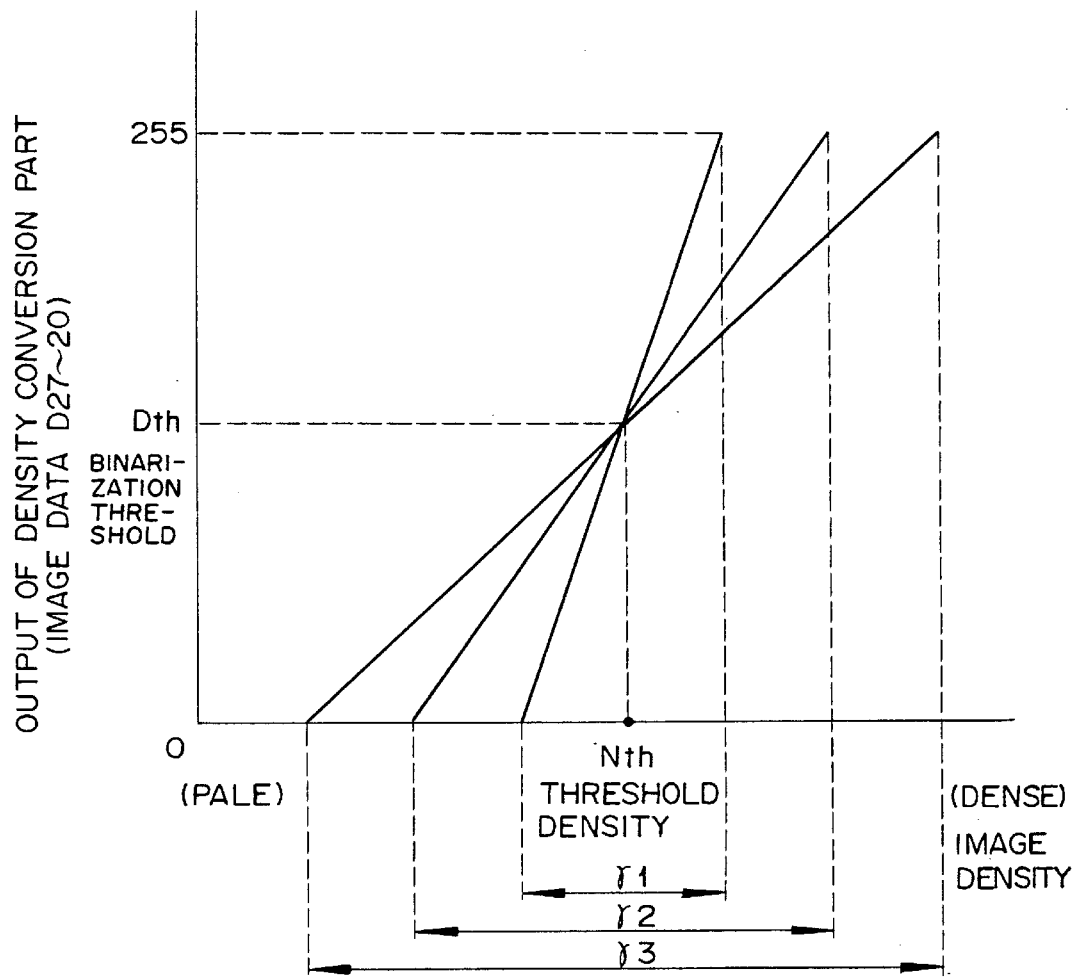
FIG. 17 is a graph showing the change in the input/output characteristics of a density conversion part caused by switch of conversion tables.

Then, at Step #75, the method of setting the density is checked to decide whether or not the setting is automatically effected. When the method of setting is not automatic, namely when it is manual, the luminous energy of the lamp is set on the basis of an operation designated by an operator at Step #76. The value of density designated by the operator corresponds to the image density which forms the threshold of the simple binarization (hereinafter referred to a "threshold density Nth"). In the positive image, the threshold density Nth increases in proportion as the value of designated density increases. Here, the action of changing the luminous energy of the lamp in conformity with the value of designated density equals the action of fixing the luminous energy of the lamp and altering the threshold density Nth by shifting the γ curve as illustrated in FIG. 16. In contrast thereto, the action of changing the inclination of the γ curve proportionately to the contrast C in the case of a specific value of designated density as described above equals the action of suitably selecting the ranges of density γ1, γ2, and γ3 permitting repetition of gradient as illustrated in FIG. 17.

Figure 18:
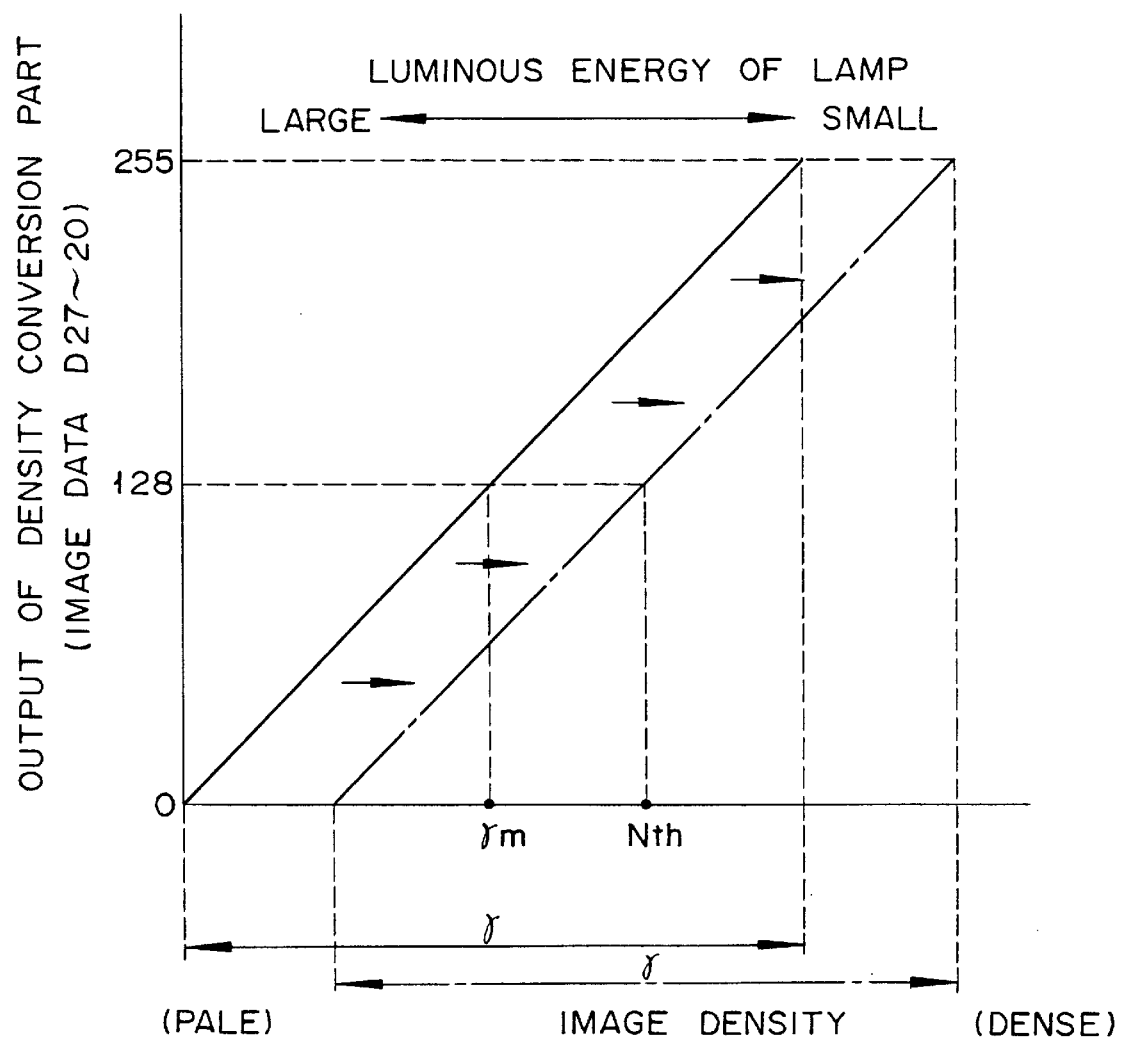
FIG. 18 is a graph showing a typical alteration caused in the contents of density variation by adjustment of the luminous energy used for scanning.

At Step #76, the luminous energy of the lamp is set so that in the γ curve of a prescribed inclination selected in conformity with the contrast C, the median γm in the substantial range γ of compensation of the γ curve (the density corresponding to the median "128" of the output) coincides with the threshold density Nth to be designated as illustrated in FIG. 18. In the case of the data illustrated in the diagram, the luminous energy of the lamp is set at a value smaller than usual.

Figure 19:
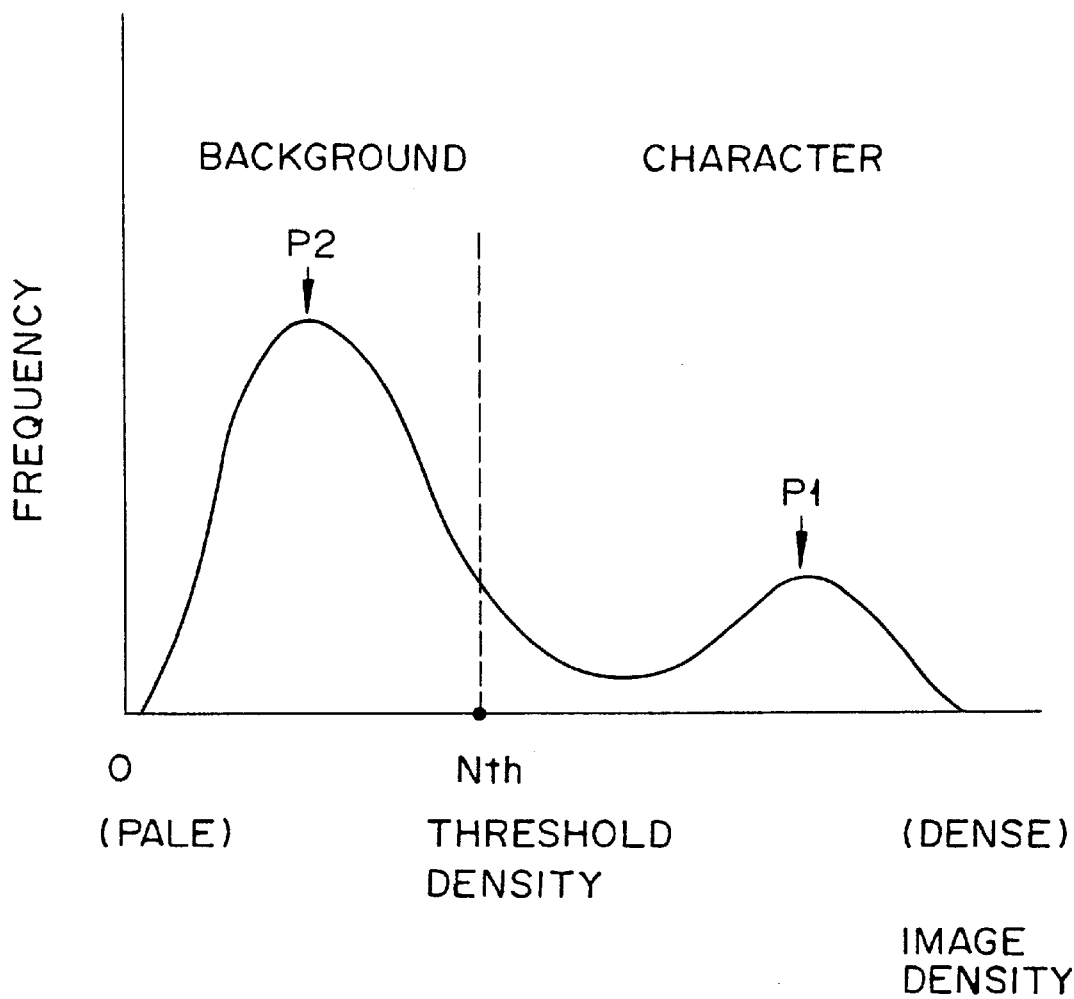
FIG. 19 is a histogram showing one example of the density distribution of a character image.

When the decision to be made at Step #75 finds the method of setting the density to be automatic, the threshold density Nth is selected based on the histogram of density obtained in advance and the luminous energy of the lamp is set so that the median ym of the range of density γ of the γ curve coincides with the selected threshold density Nth (Step #77). The automatic setting of density is effective only when the image of a given original document consists mainly of characters. Generally in this case, the histogram has peaks P1, P2 in each of the character part and the background part as illustrated in FIG. 19. The threshold density Nth is defined as the median of the values of density which correspond to the peaks P1, P2 of each of the character part and the background part.

Incidentally at Step #76 mentioned above, the switch of the γ curve may be conceived besides the change of the luminous energy of the lamp as a method for altering the threshold density Nth proportionately to the value of density designated by an operator. The adjustment of density by the luminous energy of the lamp proves advantageous, however, in due consideration of the optical noise and the electrical noise in the image sensor 10. For the purpose of adjusting the density, therefore, it is desirable to utilize the luminous energy of the lamp within the range in which this luminous energy allows the adjustment to advantage and then rely on the switch of the γ curve outside the range.

Figure 12:
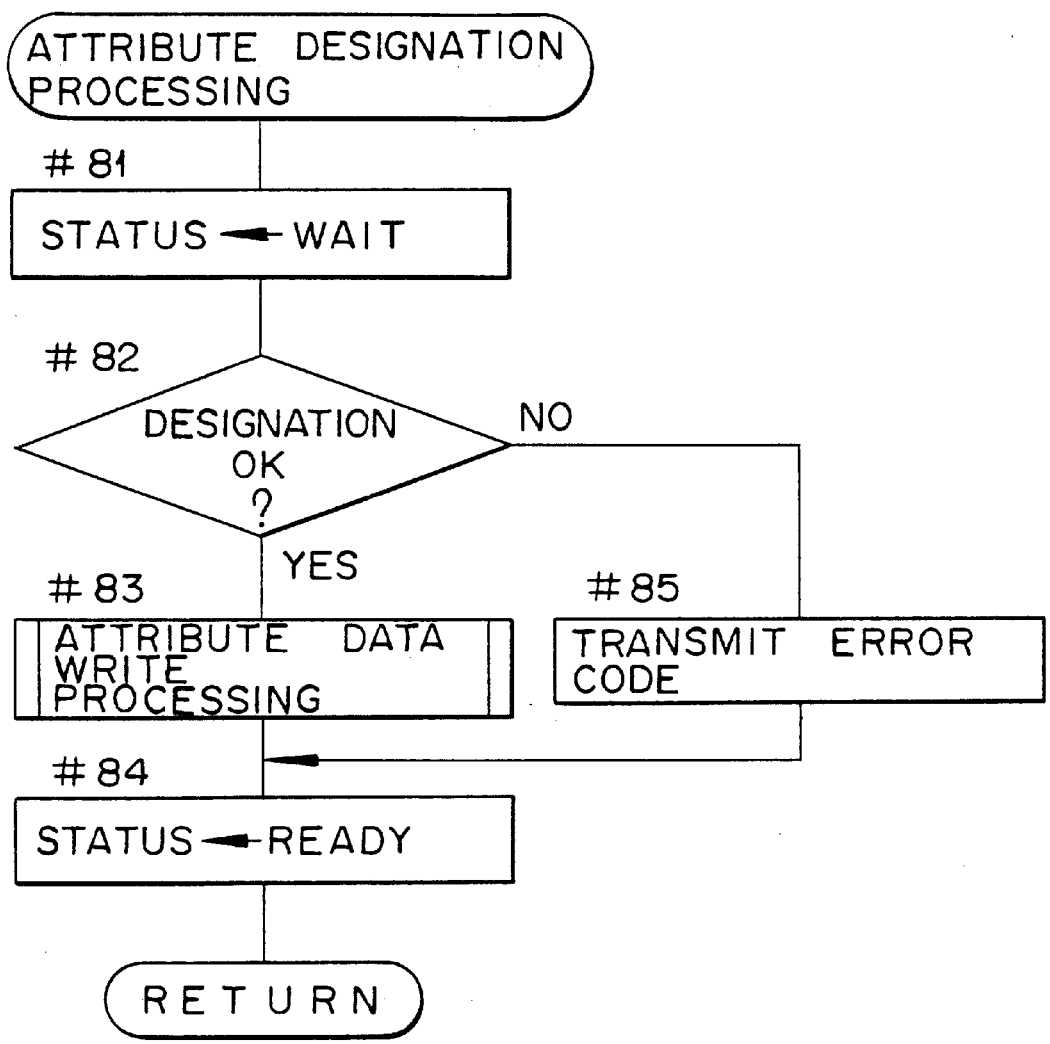
FIG. 12 is a flow chart illustrating the attributes designating processing of FIG. 5.

FIG. 12 is a flow chart of the attribute designation processing to be performed at Step #6 in the flow of processing shown in FIG. 5.

First, the status is set at "WAIT" (Step #81) and the designation is checked to find whether or not it is correct (Step #82).

When the designation is not correct as when an area outside the range set for reading is designated or when an error exists in the sequence of designation of coordinates, for example, the flow of processing moves to Step #85 and an error code is transmitted to the host device.

When the designation is correct, the attribute data write processing for writing the designation attribute data a0, a1, and a2 in the attribute memory 30 is executed (Step #83) and the status is set to "READY" (Step #84).

Figure 13:
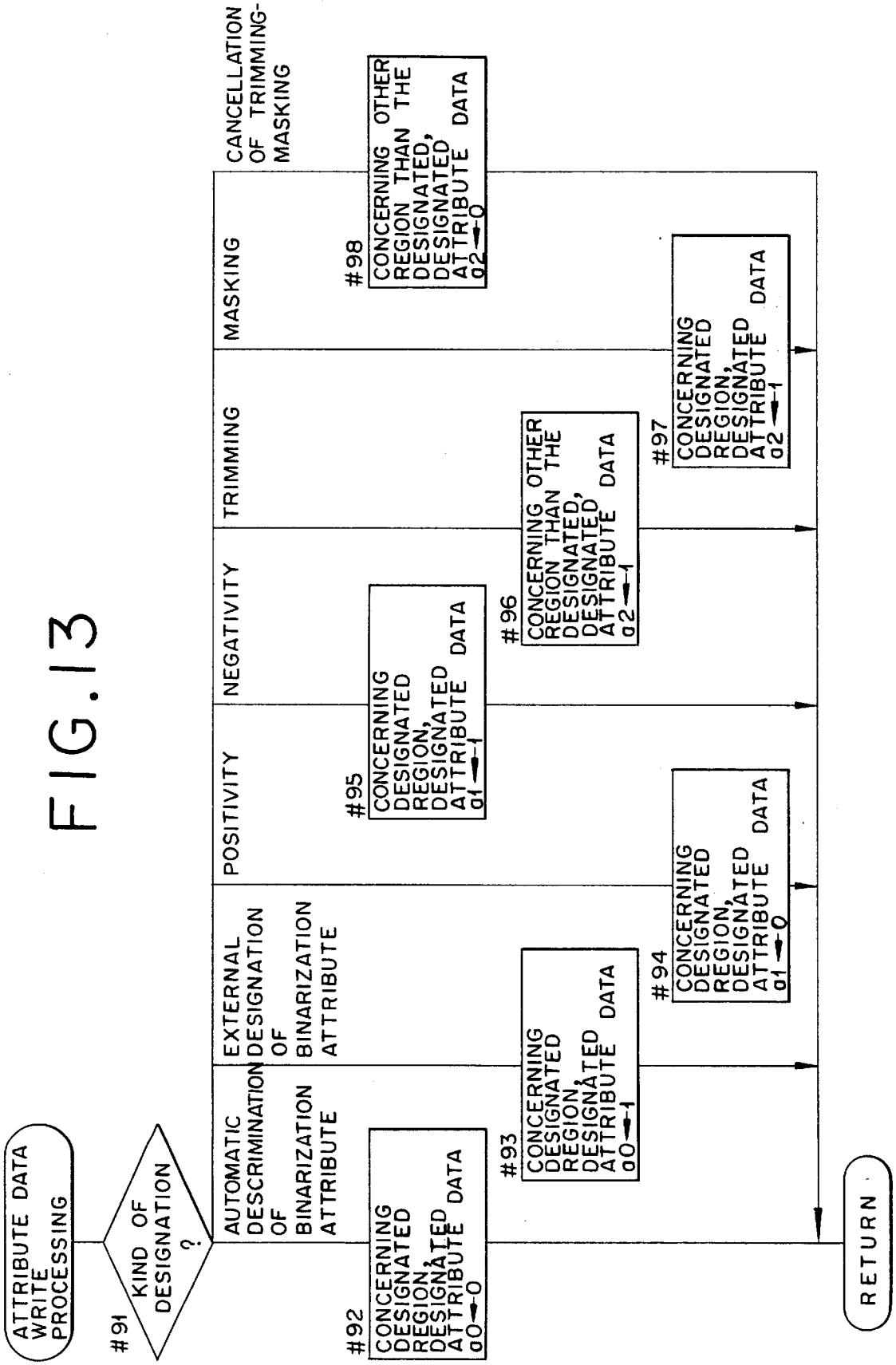
FIG. 13 is a flow chart illustrating the attributes data writing processing of FIG. 12.

FIG. 13 is a flow chart illustrating the attribute data write processing to be performed at Step #83 in the flow of processing shown in FIG. 12.

At Step #91, the designation from the host device is checked to find the kind of designation and, depending on the kind thus found, the various processings of Steps #92 to #98 are executed.

When automatic discrimination of the binarization attribute is designated, the designated attribute data a0 with respect to the designated region E is set at "0" at Step #92. When the binarization attribute has been designated in advance, the designation attribute data a1 is set at "1" with respect to the designated region E at Step #93.

When the positivity of image is designated, namely when the nonnecessity of the white-black conversion is designated, the designation attribute data a1 is set at "0" with respect to the designated region E at Step #94. In contrast thereto, when the negativity is designated, namely the necessity of the white-black conversion is designated, the designated attribute data a1 is set at "1" with respect to the designated region E at Step #95.

When the trimming is designated, the designation attribute data a2 is set at "1" with respect other region than the designated region E at Step #96. When the masking is designated, the designation attribute data a2 is set at "1" with respect to the designated region E at Step #97. When the cancellation of trimming-masking processing is designated, the designation attribute data a2 is reset at "0" with respect to other region than the designated region E at Step #98.

Figure 14:
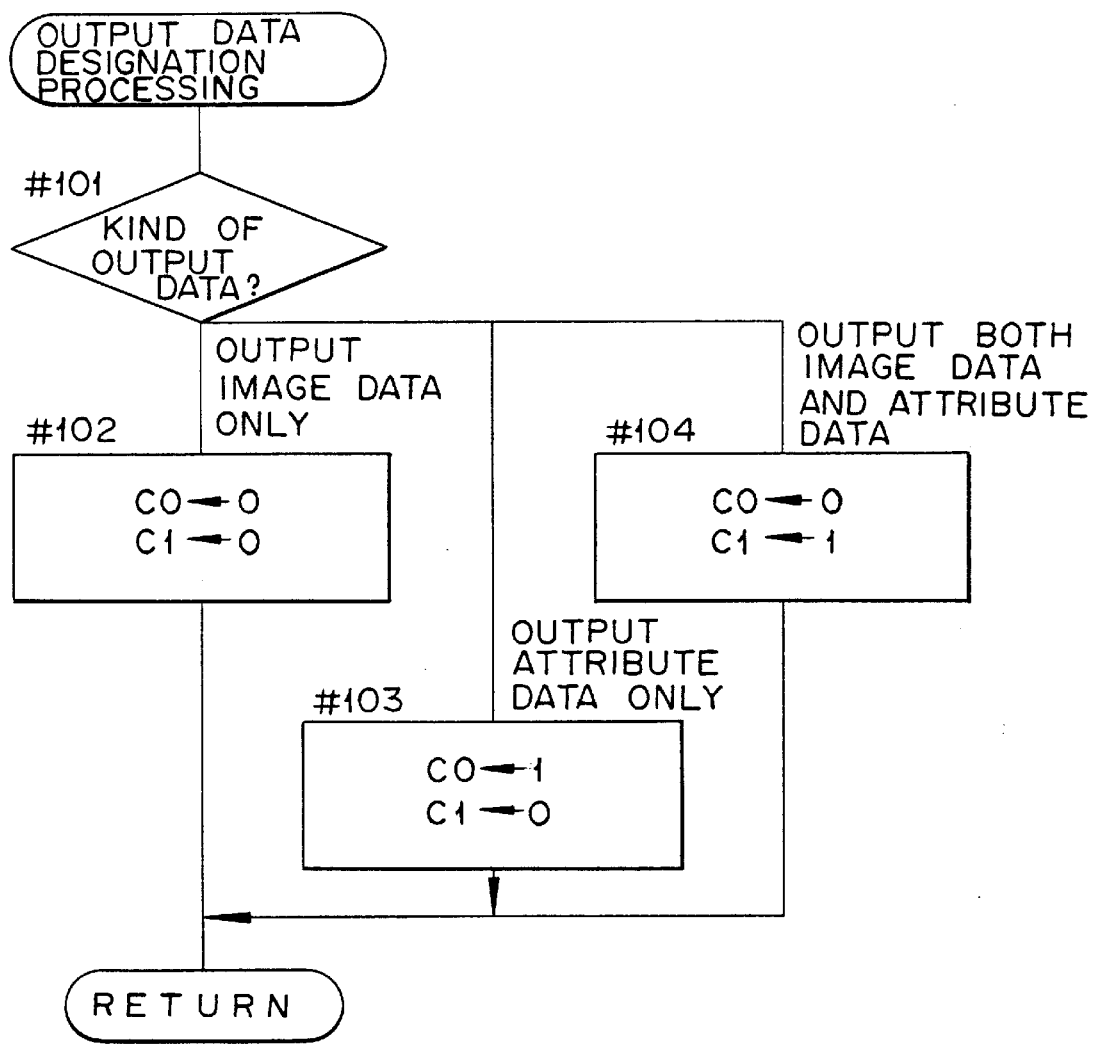
FIG. 14 is a flow chart illustrating the output data designating processing of FIG. 5.

FIG. 14 is a flow chart illustrating the output data designation processing to be performed in the flow of processing at Step #7 shown in FIG. 5.

In this routine, first the output data DATA is checked to find the kind of data at Step #101 and, depending on the kind of data so found, the processings at Steps #102 to #104 are executed.

When the outputs exclusively of the image data VIDEO 0 to 7 are selected, the output control data C0 and C1 are both set at "0" at Step #102. When the outputs exclusively of the attribute data a4 to a0 are selected, the processing of Step #103 is executed and the output control data C0 is set at "1" and the output control data C1 is set at "0."

When the outputs of both the image data VIDEO 0 to 7 and the attribute data a4 to a0 are selected, the output control data C0 is set at "0" and the output control data C1 is set at "1" at Step #104.

In the embodiment described above, since the γ conversion is effected by preparing a histogram indicative of the density distribution of an image on a given original document and, based on this histogram, switching the conversion tables T1 to T3 in conformity with the contrast C, ideal repeatability of pseudo-gradient enough to permit production of an image enjoying an improved quality is attained without reference to the overall status of density of the image as to lightness or darkness.

In the embodiment described above, the distinction of an image of characters on a given original document can be exalted without reference as to the density of characters because the threshold density Nth of the simple binarization is selected based on the histogram indicative of the density distribution of an image on an original document and the adjustment of density is effected by setting the luminous energy of the lamp during the automatic setting of density.

In the embodiment described above, the contents of the image processing can be suitably selected to suit the purpose for which the produced image is used and such factors as the construction of each of the component parts of the image reader 1 and the timing of the operation of the image reader 1 can be altered variously to fulfill the spirit of this invention.

The embodiment described above represents a case of using an image reader 1 which is so adapted as to operate by effecting photoelectric conversion of a scanning light reflected on an original document. This invention can be applied likewise to a film scanner adapted to operate by effecting the photoelectric conversion of a scanning light which has passed through an original document.

Further, the embodiment described above represents a case of using a ROM for preparatorily storing therein three γ curves as a plurality of sets of gradient compensation data. It is permissible to have one γ curve stored preparatorily in the ROM and, immediately prior to compensation of gradient, have the γ curve in the ROM revised in conformity with the contrast of a given image and put to use for the gradient compensation.

What is claimed is:

1. An image processing device for processing multivalue image data, comprising:
   a memory having stored therein a plurality of different sets of tone compensation data;
   detecting means for detecting a density contrast of an image represented by a plurality of image data;
   selecting means for selecting one of said sets of tone compensation data in response to the density contrast detected by said detecting means; and
   compensating means for compensating a tone of the image data based on the tone compensation data selected by said selecting means.

2. An image processing device according to claim 1, which further comprises means for forming a histogram of numerical values of said plurality of image data and wherein said detecting means detects said density contrast based on a width of said histogram.

3. An image processing device according to claim 1, which further comprises means for causing the image data having a gradient thereof compensated by said compensating means to be binarized based on a threshold.

4. An image processing device according to claim 3, which further comprises means for forming a histogram of the numerical values of said group of image data and threshold setting means for setting said threshold on the basis of said histogram.

5. An image processing device according to claim 4, wherein said threshold setting means, when said histogram has two peaks, for setting said threshold at a magnitude equal to a median of data values corresponding to said peaks.

6. An image processing device according to claim 1, wherein said tone compensation data are in a form of a lookup table showing correspondence between values of image data for input and the values of the image data for output.

7. An in age reading device, comprising:
   a lamp;
   an image sensor for reading an image on an original document illuminated with said lamp and issuing multivalue image data in conformity with a density of each pixels of said image;
   a memory for storing a plurality of gradient compensation data having mutually different contents;
   detecting means for detecting a contrast of an image indicated by a plurality of the image data produced by said image sensor;
   selecting means for selecting one of said gradient compensation data in conformity with the contrast detected by said detecting means;
   compensating means for compensating the gradient of said image data based on the gradient compensation data selected by said selecting means;
   adjusting means for adjusting luminous energy of said lamp so that a median in a substantial range of compensation based on the gradient compensation data selected by said selecting means coincides with a threshold; and
   means for causing the image data having the gradient thereof compensated by said compensating means to be binarized on the basis of said threshold.

8. An image reading device according to claim 7, which further comprises means for forming a histogram of values of said plurality of image data produced by said image sensor and wherein said detecting means detects said contrast on the basis of a width of said histogram.

9. An image reading device according to claim 7, which further comprises means for forming a histogram of the values of said group of image data produced from said image sensor and threshold setting means for setting said threshold on the basis of said histogram.

10. An image reading device according to claim 9, wherein said threshold setting means, when said histogram has two peaks, sets said threshold at a magnitude equal to the median of data values corresponding to said peaks.

11. An image reading device according to claim 7, which further comprises control means for controlling said image sensor so as to read the image of said original document again after the adjustment by said adjusting means and wherein said compensating means compensates a tone of the image data produced from said image sensor after the adjustment by said adjusting means.

12. An image reading device according to claim 11, wherein said binarizing means binarizes the image data produced by said compensating means after the adjustment by said adjusting means is effected.

13. A method for reading an image by use of an image reading device provided with a memory for storing a plurality of gradient compensation data having mutually different contents, comprising the steps of:

illuminating an original document with a lamp;

reading the image on said original document illuminated by said lamp and producing multivalue image data conforming with a density of each pixels of said image;

detecting a contrast of image indicated by a group of produced image data;

selecting one of said gradient compensation data in conformity with said detected contrast;

adjusting luminous energy of said lamp so that a median in a substantial range of compensation based on the gradient compensation data selected by said selecting means coincides with a threshold;

reading the image on said original document again and producing multivalue image data conforming with the density of each of said pixels;

compensating the gradient of the produced image data based on the selected gradient compensation data; and binarizing the image data having the gradient thereof compensated based on said threshold.

* * * * *